(12) United States Patent
Kim

(10) Patent No.: US 7,071,993 B2
(45) Date of Patent: Jul. 4, 2006

(54) DIGITAL BROADCAST RECEIVING DEVICE AND METHOD USING THE SAME

(75) Inventor: Jin-hong Kim, Suwon (KR)

(73) Assignee: Samsung Electronics Co., Ltd., Gyunggi-do (KR)

( * ) Notice: Subject to any disclaimer, the term of this patent is extended or adjusted under 35 U.S.C. 154(b) by 616 days.

(21) Appl. No.: 10/334,714

(22) Filed: Jan. 2, 2003

(65) Prior Publication Data

US 2003/0122962 A1 Jul. 3, 2003

(30) Foreign Application Priority Data

Jan. 2, 2002 (KR) .................................. 2002-108

(51) Int. Cl.
*H04N 7/00* (2006.01)
(52) U.S. Cl. ...................... 348/465; 348/468
(58) Field of Classification Search ............... 348/512, 348/515, 468, 589, 600, 465, 467; 725/137; 386/95, 125, 126; H04N 7/00, 11/00, 9/475, H04N 9/74
See application file for complete search history.

(56) References Cited

U.S. PATENT DOCUMENTS 5,995,159 A * 11/1999 Bae et al. ................... 348/563
6,288,750 B1 * 9/2001 Yamada et al. ............. 348/553
6,829,429 B1 * 12/2004 Kitahashi et al. ........... 348/468

* cited by examiner

*Primary Examiner*—Sherrie Hsia
(74) *Attorney, Agent, or Firm*—Sughrue Mion, PLLC

(57) ABSTRACT

A digital broadcast receiving device and method thereof is capable of synchronizing text data to currently broadcasting video data and/or audio data and displaying the same. The digital broadcast receiving device has a text data reading unit for reading a text data from a bit stream of a digital broadcast program; a text data synchronizing unit for synchronizing the read text data to currently-broadcasting video data and/or audio data; and a text data outputting unit for outputting, thus displaying the read text data on a display. The text data outputting unit outputs the read text data such that certain portion that is synchronized to the currently broadcasting video data and/or audio data can be distinguished among others. As a result, viewers can catch the intended information immediately even when the information is ETT text data that contains a large amount of information.

14 Claims, 3 Drawing Sheets

DIGITAL BROADCAST RECEIVING DEVICE AND METHOD USING THE SAME

BACKGROUND OF THE INVENTION

1. Field of the Invention

The present invention generally relates to a digital broadcast receiving device and a method thereof, and more particularly, it relates to a digital broadcast receiving device capable of efficiently providing viewers with information about programs transmitted from a broadcasting station, and a method thereof.

2. Description of the Prior Art

Since the US DirecTV enforced digital satellite broadcasting in 1994, the digital broadcasting has been enforced or prepared globally. The rival media, cable television, is digitalized in Europe and the USA thereafter and all broadcasting media is being digitalized since the terrestrial broadcasting which gained attention launched its trial broadcast in USA and UK in November 1998. Korea also opened an era of digital broadcast with a trial of digital satellite broadcasting in July 1996 and the Korean Broadcasting System (KBS) successfully broadcasted the national first digital terrestrial broadcasting in May 1999, ranking Korea among the advanced countries in the field of digital broadcasting.

The characteristics of digital broadcasting can be summarized by three features, namely, a multi-channel, high quality, and a multi-function. Among the above features, the multi-function means that, besides image and sound, a variety of additional services can be provided using data channels, and that is the most significant characteristic which can differentiate the digital broadcast from the analogue broadcast.

Due to the advancement of the multiplex technology, the digital broadcasting can transmit image, sound, and data simultaneously in a bundle regardless of the content and size. In addition, since the digital broadcasting is provided with the return channel through a modem, interactive service is possible, and a processor and an operation system inside a receiver make various receiving functions possible. Owing to the advancement of such technologies, the digital broadcasting became able to provide one step upgraded multimedia service to viewers beyond additional service realized in the existing analogue broadcasting.

In the digital broadcasting system capable of realizing a variety of service as above, a broadcasting signal includes largely program data and Program and System Information Protocol (PSIP) data.

The program data is TV programs provided by a broadcasting station for being broadcast to subscribers and includes user information such as video data, audio data, and caption data. The program is provided in a Transport Stream (TS). The TS is an agreement which video, audio and data are simultaneously transmitted in a single stream in the Motion Picture coding Experts Group (MPEG)-2 system. The TS is comprised of one or more programs, and TS header includes information about programs constituting the whole stream, program time information, and control information for controlling overall system. The TS packet is comprised of 188 bytes and has 4-byte header in the upper portion. The sync byte is one byte, and cannot be used in other parts that are periodically repeated, for example, Packet Identifier (PID). The PID, which is comprised of 13 bits, is an ID for identifying packets. The TS packet is comprised of pure data such as video, audio and data and the Program Specific Information (PSI).

The PSI information is data repeatedly transmitted in a fixed time period for initialization in a receiver and is comprised of table structure divided by sections of 1024 bytes. The PSI information begins with Table_id. In addition, the PSI information includes Program Association Table (PAT) information, Program Map Table (PMT) information, Condition Access Table (CAT), and private section. Among the PSI information, the PAT information is the table having "0" PID. The PAT information functions to inform the PMT PID. The PMT information informs the content of streams included in a program and the PID. The CAT information provides information for limited reception. The private section is a section that can be used by a user by choice and the PSIP information uses this section.

The Program and System Information Protocol (PSIP) data is a group of tables designed to be included inside the TS for digital television. The purpose of the PSIP information is to disclose information of a virtual channel for specific TS. The PSIP information hierarchically combines factors describing particular service of a digital television at respective channels. Such PSIP information includes a modulation method of each channel required for normal reception of each channel broadcasting program, carrier frequency, packet ID information for inverse-multiplexing video and audio information from the packet stream transmitted via a carrier channel, program information (i.e., program title, commencing time, synopsis) whether caption service is provided or not, program classification, and current time.

Accordingly, when a digital broadcast channel is selected, the digital broadcast receiver is synchronized to the selected broadcast channel, separates PSIP data from the packet stream and stores the separated PSIP data in the internal memory, and inverse-multiplexes video and audio data by using the stored PSIP data. The PSIP data include base table data including system time table (STT) data, rating region table (RRT) data, master guide table (MGT) data, and virtual channel table (VCT) data, and data containing PID data defined in the MGT such as event information table (EIT) data and extended text table (ETT) data. PID data is a special ID provided to discriminate among multiple elementary stream (ES) in the TS. PID data is positioned in the TS header.

STT data is one of PSIP data in advanced television system committee (ATSC) standard, which provides information about current date and time. RRT data is one of PSIP data in ATSC standard, which provides level information of plural regions. MGT data provides PID data which correspond to version numbers of all the PSIP data except STT data operating independently of the other tables, table length, and table type. VCT data describe information about virtual channel, and include therein information such as major channel number, minor channel number, modulation mode, carrier frequency, program number, ETM location data indicating the location of the PSIP data where detailed information about virtual channel and event exists, and service type.

EIT data contain information about program content. EIT data also contain event information (title, starting time) about the virtual channel defined by the PSIP data. One piece of EIT data contain event information lasting about three (3) hours, and total 128 pieces of EIT data can be transmitted by from EIT-0 to EIT-127. ETT data refer an option table used in describing in the PSIP data the virtual channel and event in greater detail.

The digital broadcast receiver receives PSIP data and PSI data provided by the broadcasting station. However, as some information such as ETT data contained in the PSIP data carry considerable amount of text data about current broadcast, viewers usually do not understand the currently-broadcasting program and ETT data immediately.

SUMMARY OF THE INVNETION

Accordingly, it is an object of the present invention to provide a digital broadcast receiving device enabling a viewer to catch information at a glance by synchronizing text data to the currently-broadcasting program, and a method thereof.

The above object is accomplished by a digital broadcast receiving device according to the present invention, including a text data reading unit for reading a text data from a bit stream of a digital broadcast program; a text data synchronizing unit for synchronizing the read text data to currently-broadcasting video data and/or audio data; a text data outputting unit for outputting, thus displaying the read text data on a display; a text data classifying unit for classifying the text data according to the characteristic of the read text data; a text data selecting unit for selecting among the classified text data a text data for indicating on the display; a first buffer and a second buffer.

The text data outputting unit outputs the read text data in a manner such that a certain portion synchronized to the currently-broadcasting video data and/or audio data can be distinguished among others. The text data outputting unit outputs the text data selected by the text data selecting unit on the display.

The text data classifying unit includes a system time table (STT) classifying unit for classifying a STT text data according to STT of a program and system information protocol (PSIP) provided for the read text data; an event information table (EIT) classifying unit for classifying an EIT text data according to an EIT of the PSIP; an extended text table (ETT) classifying unit for classifying an ETT text data according to an ETT of the PSIP; a program map table (PMT) classifying unit for classifying a PMT text data according to a PMT of a PSI provided for the read text data; and a DTVCC classifying unit for classifying a DTVCC text data according to a DTVCC of the PSI.

The text data selecting unit selects, based on the STT and the EIT, the ETT text data corresponding to the currently-broadcasting video data and/or audio data, and stores the selected data in the first buffer.

The text data selecting unit selects from the bit stream based on the PMT and DTVCC, the caption data corresponding to the currently-broadcasting video data and/or audio data.

The text data synchronizing unit searches the ETT text data for a portion corresponding to the caption data stored in the second buffer, and the text data outputting unit outputs the data on the display in a manner such that the searched portion of the ETT text data can be distinguished among others on the display.

The digital broadcast receiving device according to the present invention synchronizes the text data to the currently-broadcasting program, thereby enabling the viewers to catch the intended information at a glance.

BRIEF DESCRIPTION OF THE DRAWINGS

The above-mentioned object and the feature of the present invention will be more apparent by describing the preferred embodiment of the present invention by referring to the appended drawing, in which.

DETAILED DESCRIPTION OF THE PREFERRED EMBODIMENT

Figure 1:
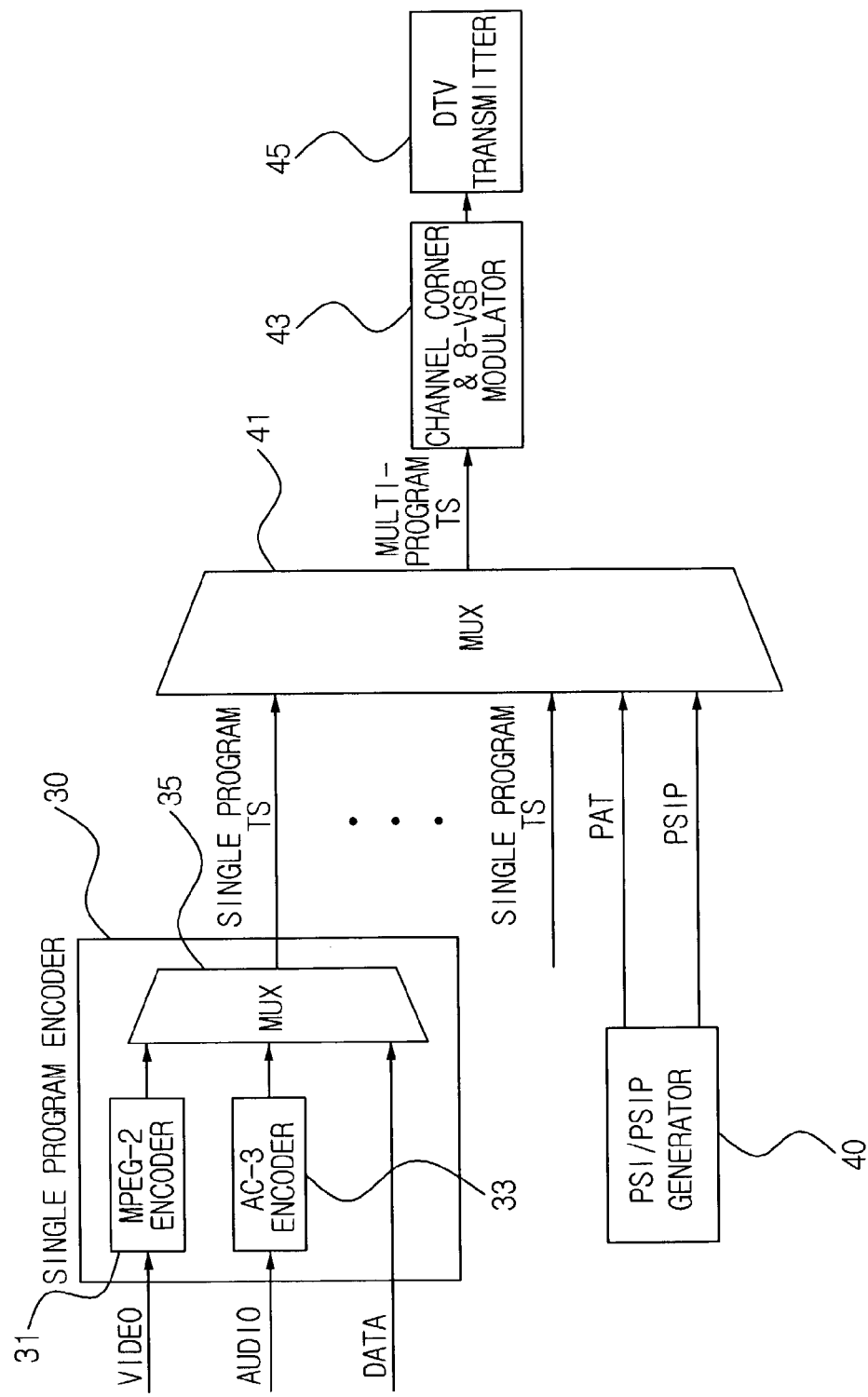
FIG. 1 is a schematic view showing an ATSC PSIP transmitting system.

FIG. 1 is a schematic view showing the ATSC PSIP transmitting system. Program and system information protocol (PSIP) of the advanced television system committee (ATSC) standard, is used to transmit information about broadcast MPEG-2 transport stream (TS) and electronic program guide (EPG).

A single program encoder 30 includes a MPEG-2 encoder 31, an AC-3 encoder 33 and a multiplexer 35. The MPEG-2 encoder 31 encodes video data. The AC-3 encoder 33 encodes audio data. The multiplexer 35 receives encoded video and audio data and the other data and multiplexes the received data into a single program TS.

A PSI/PSIP generator 40 generates PAT data and PSIP data. Among the PSI data, the PAT data are the table having '0' PID. The PAT data inform PMT PID. The PSIP-defined table is constructed based on the private table standard by the MPEG-2 system, and multiplexed together with the video and audio data of the program and transmitted.

PSIP-defined tables are: a system time table (STT) used for transmitting current date and time, a master guide table (MGT) for listing versions of the tables to be transmitted and the TS packet identifiers of the following tables, a virtual channel table (VCT) of the extended standard from the program connection table of the MPEG-2 system for providing detailed information such as channel name, carrier frequency, etc., an event information table (EIT) used for guiding information about programs being provided or to be provided for respective time, and an extended text table (ETT) for transmitting additional detailed explanation about the programs listed in the EIT table.

The multiplexer 41 receives PAT and PSIP data from the plurality of single program encoders 30 and the PSI/PSIP generator 40, and multiplexes the received data into multi-program transport stream (TS). The modulator 43 receives the multiplexed multi-program TS and transmits the same to the DTV transmitter 45.

Figure 2:
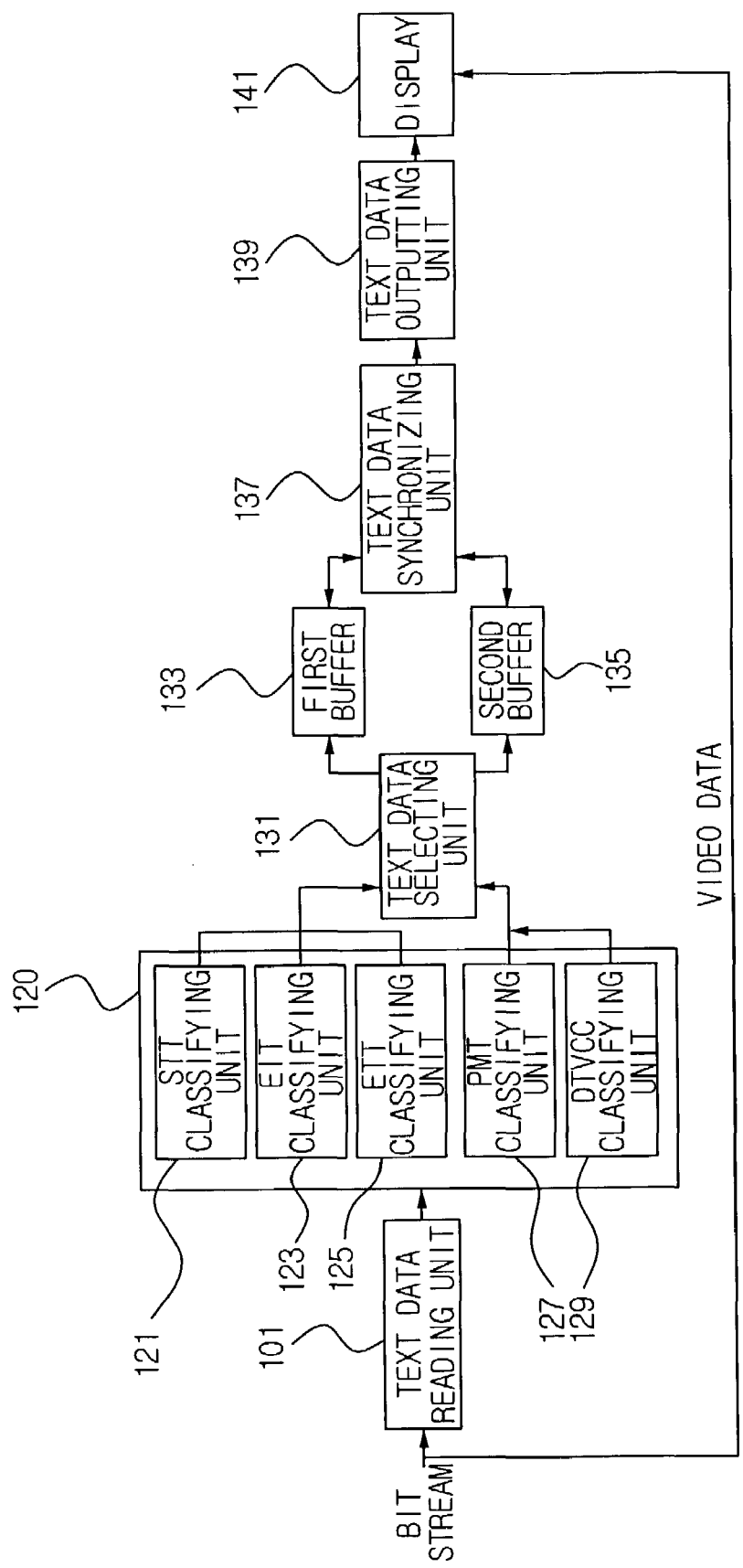
FIG. 2 is a schematic view showing a digital broadcasting receiving device according to the present invention.

FIG. 2 schematically shows the digital broadcast device according to the present invention. Referring to FIG. 2, the digital broadcast receiver includes a text data reading unit 101, a text data classifying unit 120, a text data selecting unit 131, a first buffer 133, a second buffer 135, a text data synchronizing unit 137, a text data outputting unit 139 and a display 141. The text data classifying unit 120 includes a STT classifying unit 121, an EIT classifying unit 123, an ETT classifying unit 125, a PMT classifying unit 127 and a DTVCC (Digital Television Closed-Captioning) classifying unit 129.

The text data reading unit 101 reads the text data from the bit streams of digital broadcast program. The text data contain therein PSIP data and PSI data. The text data classifying unit 120 classifies text data according to the characteristic of the read text data. The STT classifying unit 121 classifies the STT text data according to the STT data of the PSIP data. The EIT classifying unit 123 classifies the EIT text data according to the EIT data of the PSIP data. The ETT classifying unit 125 classifies the ETT text data according to the ETT data of the PSIP data. The PMT classifying unit 127 classifies the PMT text data according to the PSI data of the read text data. The DTVCC classifying unit 129 classifies the DTVCC text data according to the DTVCC data of the PSI data. The DTVCC data are caption data information which is transmitted through a user data region of MPEG-2 video stream.

Among the classified text data, the text data selecting unit 131 selects the text data for indicating on the display 141. The text data selecting unit 131 can select the ETT text data that correspond to the currently-broadcasting video data and/or audio data, based on the STT data and EIT data. When the ETT text data are selected by the text data selecting unit 131, the first buffer 133 receives the selected ETT text data and stores the received data.

Further, the text data selecting unit 131 can also select from the bit stream the caption data about the currently-broadcasting video data and/or audio data, based on the PMP data and DTVCC data. When the caption data are selected by the text data selecting unit 131, the second buffer 135 receives and stores the selected caption data.

The text data synchronizing unit 137 synchronizes the read text data to the currently-broadcasting video data and/or audio data. At this point, the text data synchronizing unit 137 searches the ETT text data stored in the first buffer 133 for a portion that corresponds to the caption data stored in the second buffer 135.

The text data outputting unit 139 outputs the read text data for indicating on the display 141. The text data outputting unit 139 outputs the read text data such that the portion that is synchronized to the currently-broadcasting video data and/or audio data can be distinguished among others. In this embodiment, the text data outputting unit 139 outputs the data to the display 141 such that, among the ETT text data stored in the first buffer 133, certain portion that corresponds to the caption data stored in the second buffer 135 can be distinguished.

The display 141 receives the read text data from the text data reading unit 101, and displays the received data together with the video data received from the bit streams of digital broadcast program.

Figure 3:
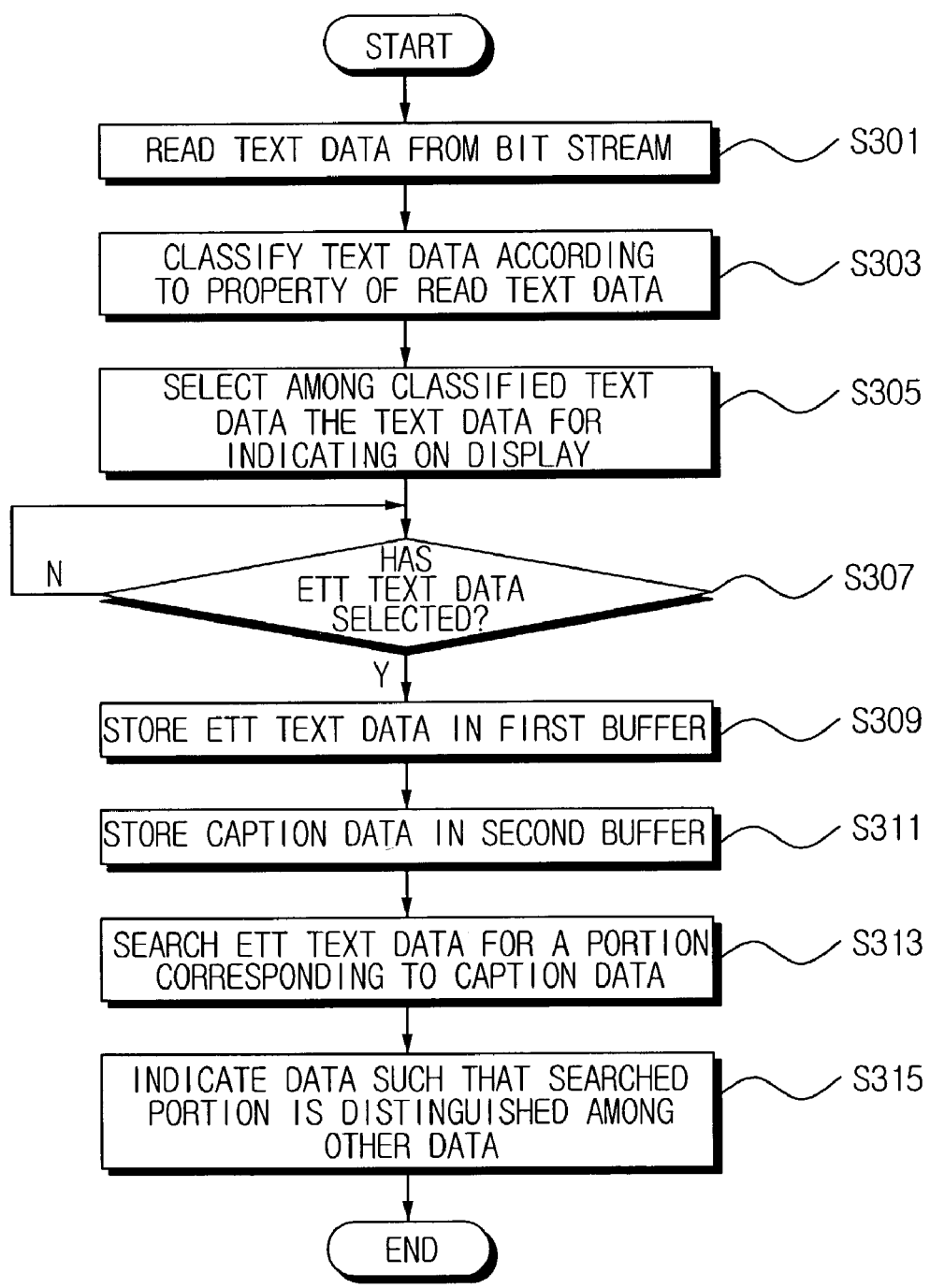
FIG. 3 is a flowchart showing a digital broadcast receiving method with the digital broadcast receiver of FIG. 2.

FIG. 3 is a flowchart showing the digital broadcast receiving method of the digital broadcast receiving device of FIG. 2 according to the present invention.

Referring to FIG. 3, the digital broadcast receiving device receives bit streams of a digital broadcast program from the ATSC PSIP transmitting system. The text data reading unit 101 reads text data from the received bit streams of digital broadcast program (step S301). The text data reading unit 101 transmits the read text data to the text data classifying unit 120. The text data classifying unit 120 receives the read text data, and classifies the received text data according to respective characteristic (step S303). At this point, the text data classifying unit 120 classifies the STT text data according to the STT data of the PSIP data provided for the text data, classifies the EIT text data according to the EIT data of the PSIP data, and also classifies the ETT text data according to the ETT data of the PSIP data. Further, the text data classifying unit 120 classifies the PMT text data according to the PMT data of the PSI data provided for the text data, and classifies the DTVCC text data according to the DTVCC data of the PSI data.

The text data selecting unit 131 selects among the classified text data the text data for indicating on the display 141 (step S305). The text data selecting unit 131 can select the ETT text data that correspond to currently-broadcasting video data and/or audio data based on the STT data and EIT data. When the ETT text data are selected by the text data selecting unit 131 (step S307), the first buffer 133 receives and stores the selected ETT text data (step S309). In addition, based on the PMT data and DTVCC data, the text data selecting unit 131 selects from the bit stream the caption data about the currently-broadcasting video data and/or audio data and stores the selected caption data in the second buffer 135 (step S311).

The text data synchronizing unit 137 searches the ETT text data stored in the first buffer 133 for a portion that corresponds to the caption data stored in the second buffer (step S313). When there is a certain portion in the ETT text data searched by the text data synchronizing unit 137 as corresponding to the caption data, the text data outputting unit 139 indicates the data on the display 141 such that the searched portion can be distinguished among others (step S315).

As described above, the digital broadcast receiving device can display the read text data together with the video data on the display 141, or synchronize the text data to the audio data that are output through a speaker (not shown). Especially when there is a large amount of information to be displayed, the digital broadcast receiving device is capable of displaying the data while distinguishing the specific portion that is synchronized to the video data and/or audio data among others. Accordingly, viewers can catch the information immediately.

Although the preferred embodiment of the present invention has been described, it will be understood by those skilled in the art that the present invention should not be limited to the described preferred embodiment, but various changes and modifications can be made within the spirit and scope of the present invention as defined by the appended claims.

What is claimed is:

1. A digital broadcast receiving device, comprising:
   a text data reading unit for reading text data from a bit stream of a digital broadcast program;
   a text data synchronizing unit for synchronizing the read text data to currently-broadcast video data and/or audio data by searching ETT text data for a portion that corresponds to caption data; and
   a text data outputting unit for outputting the synchronized read text data to a display.

2. The digital broadcast receiving device of claim 1, wherein the text data outputting unit outputs the read text data in a manner such that a certain portion synchronized to the currently-broadcast video data and/or audio data can be distinguished.

3. The digital broadcast receiving device of claim 2, further comprising:
   a text data classifying unit for classifying the text data according to characteristics of the read text data; and
   a text data selecting unit for selecting among the classified text data text data for indicating on the display, wherein the text data outputting unit outputs the text data selected by the text data selecting unit to the display.

4. A digital broadcast receiving device, composing:
   a text data reading unit for reading text data from a bit stream of a digital broadcast program;
   a text data synchronizing unit for synchronizing the read text data to currently-broadcast video data and/or audio data;
   a text data outputting unit for outputting the read text data to a display,
   a text data classifying unit for classifying the text data according to characteristics of the read text data; and a text data selecting unit for selecting among the classified text data text data for indicating on the display, wherein the text data outputting unit outputs the text data selected by the text data selecting unit to the display;

wherein the text data outputting unit outputs the read text data in a manner such that a certain portion synchronized to the currently-broadcast video data and/or audio data can be distinguished; and wherein the text data classifying unit comprises:

a system time table (STT) classifying unit for classifying a STT text data according to STT of a program and system information protocol (PSIP) provided for the read text data;

an event information table (EIT) classifying unit for classifying an EIT text data according to an EIT of the PSIP;

an extended text table (ETT) classifying unit for classifying an ETT text data according to an ETT of the PSIP;

a program map table (PMT) classifying unit for classifying a PMT text data according to a PMT of a PSI provided for the read text data; and a DTVCC (digital television closed-captioning) classifying unit for classifying a DTVCC text data according to DTVCC data of the PSI.

5. The digital broadcast receiving device of claim 4, further comprising a first buffer for storing the ETT text data, wherein the text data selecting unit selects, based on the STT and the EIT, the ETT text data corresponding to the currently-broadcast video data and/or audio data, and stores the selected data in the first buffer.

6. The digital broadcast receiving device of claim 5, further comprising a second buffer for storing caption data, wherein the text data selecting unit selects from the bit stream based on the PMT and DTVCC, the caption data corresponding to the currently-broadcast video data and/or audio data.

7. The digital broadcast receiving device of claim 6, wherein the text data synchronizing unit searches the ETT text data for a portion corresponding to the caption data stored in the second buffer, and the text data outputting unit outputs the data to the display in a manner such that the searched portion of the ETT text data can be distinguished on the display.

8. A digital broadcast receiving method, comprising the steps of:

reading a text data from a bit stream of a digital broadcast program;

synchronizing the read text data to a currently-broadcast video data and/or audio data by searching ETT text data for a portion that corresponds to caption data; and displaying the synchronized read text data on a display.

9. The digital broadcast receiving method of claim 8, wherein the displaying step displays the read text data in a manner such that a certain portion synchronized to the currently-broadcast video data and/or audio data is easily distinguishable.

10. The digital broadcast receiving method of claim 9, further comprising the steps of:

classifying the text data according to characteristics of the read text data; and selecting among the classified text data text data for displaying on the display, wherein the text data outputting step outputs the selected text data on the display.

11. A digital broadcast receiving method, comprising:

reading a text data from a bit stream of a digital broadcast program;

synchronizing the read text data to a currently-broadcast video data and/or audio data;

displaying the read text data on a display, wherein the displaying step displays the read text data in a manner such that a certain portion synchronized to the currently-broadcast video data and/or audio data is easily distinguishable;

classifying the text data according to characteristics of the read text data; and selecting among the classified text data text data for displaying on the display, wherein the displaying step displays the selected text data on the display;

wherein the text data classifying step comprises the steps of:

classifying a system time table (STT) text data, an event information table (EIT) text data, and an extended text table (ETT) text data corresponding to an STT, an EIT and an ETT of a program and system information protocol (PSIP) provided for the read text data; and classifying a program map table (PMT) text data and a DTVCC text data corresponding to a PMT and a DTVCC of a PSI provided for the read text data.

12. The digital broadcast receiving method of claim 11, further comprising the step of storing the ETT text data in a first buffer, wherein the text data selecting step selects, based on the STT and the EIT, the ETT text data corresponding to the currently-broadcast video data and/or audio data, and stores the selected data in the first buffer.

13. The digital broadcast receiving method of claim 12, further comprising the step of storing caption data in a second buffer, wherein the text data selecting step selects from the bit stream based on the PMT and DTVCC, the caption data corresponding to the currently-broadcast video data and/or audio data.

14. The digital broadcast receiving method of claim 13, wherein the text data synchronizing step comprises the step of searching the ETT text data for a portion corresponding to the caption data stored in the second buffer, and the text data displaying step outputs the data on the display in a manner such that the searched portion of the ETT text data is easily distinguishable on the display.

\* \* \* \* \*